US010612568B2

(12) United States Patent
Giannakopoulos et al.

(10) Patent No.: US 10,612,568 B2
(45) Date of Patent: Apr. 7, 2020

(54) CONNECTOR (71) Applicant: Crompton Technology Group Limited, Solihull, West Midlands (GB)

(72) Inventors: Ioannis Giannakopoulos, London (GB); James Bernard, Brackley (GB); Panagiota Chatzi, Oxford (GB); Ian Chase, Charfield (GB); Hugo Palmer, Oxford (GB)

(73) Assignee: CROMPTON TECHNOLOGY GROUP LIMITED, West Midlands (GB)

( * ) Notice: Subject to any disclaimer, the term of this patent is extended or adjusted under 35 U.S.C. 154(b) by 574 days.

(21) Appl. No.: 15/241,127

(22) Filed: Aug. 19, 2016

(65) Prior Publication Data
US 2017/0051767 A1 Feb. 23, 2017

(30) Foreign Application Priority Data

Aug. 21, 2015 (GR) .............................. 20150100371

(51) Int. Cl.
*F15B 15/14* (2006.01)
*F16B 9/02* (2006.01)
*F16C 7/02* (2006.01)

(52) U.S. Cl.
CPC ............ *F15B 15/1447* (2013.01); *F16B 9/02* (2013.01); *F16C 7/026* (2013.01); *F15B 15/1457* (2013.01);
(Continued)

(58) Field of Classification Search
CPC .................................. F16D 1/06; F16C 7/026
See application file for complete search history.

(56) References Cited

U.S. PATENT DOCUMENTS 3,721,134 A * 3/1973 Lamke .................... F16C 7/026
74/586
3,850,722 A * 11/1974 Kreft ....................... B29C 70/86
156/172
(Continued)

FOREIGN PATENT DOCUMENTS

DE 102011109130 A1 * 2/2013 ............... B64C 1/06
EP 0204010 A1 12/1986
(Continued)

OTHER PUBLICATIONS

Extended European Search Report for International Application No. 15196126.5 dated Jan. 18, 2017, 8 pages.

*Primary Examiner* — Matthieu F Setliff
(74) *Attorney, Agent, or Firm* — Cantor Colburn LLP (57) ABSTRACT A connector assembly includes a connector for connecting a hollow composite shaft that has been manufactured to comprise an inwardly tapered portion towards one end of the hollow composite shaft to a collar includes an insert, a collar and a tensioner. The insert is received in the tapered portion of the hollow composite shaft such that the inner surface of the tapered portion of the hollow composite shaft in use will engage with the outer tapered surface of the insert and collar includes an inner tapered surface and being sized to fit over the insert and the tapered portion of the hollow composite shaft. The tensioner is arranged, in use, to axially force the collar and the insert in opposite directions so as to exert a clamping force onto the tapered portion of the hollow composite shaft. A method of forming the assembly is also included.

6 Claims, 2 Drawing Sheets (52) U.S. Cl.
CPC ......... *F15B 2215/305* (2013.01); *F16C 7/023* (2013.01)

(56) References Cited

U.S. PATENT DOCUMENTS

| | | | |
|---|---|---|---|
| 4,548,428 A | | 10/1985 | Ruhle |
| 4,810,010 A | | 3/1989 | Jones |
| 4,848,957 A | * | 7/1989 | Umeda ................... B29C 70/86 403/374.4 |
| 4,851,065 A | * | 7/1989 | Curtz ................... B29C 53/585 156/172 |
| 5,082,314 A | | 1/1992 | Aubry |
| 5,318,374 A | * | 6/1994 | Rumberger ............. F16B 4/006 403/277 |
| 9,482,266 B2 | * | 11/2016 | Dewhirst ................ F16C 3/026 |
| 10,066,649 B2 | * | 9/2018 | Ganis ..................... B64C 25/12 |
| 2012/0060636 A1 | * | 3/2012 | Dewhirst ................ F16C 3/026 74/473.36 |
| 2016/0222993 A1 | * | 8/2016 | Goldring ................ B64C 25/22 |
| 2017/0102012 A1 | * | 4/2017 | Ganis ..................... B64C 25/12 |
| 2018/0283424 A1 | * | 10/2018 | Beale ....................... E04C 3/28 |

FOREIGN PATENT DOCUMENTS

| | | | | |
|---|---|---|---|---|
| EP | 2703653 A1 | | 3/2014 | |
| FR | 2343918 A1 | | 10/1977 | |
| GB | 2008720 A | | 6/1979 | |
| GB | 2054083 A | * | 2/1981 | ............. F16C 7/026 |
| GB | 2215008 A | | 9/1989 | |
| GB | 2247930 A | * | 3/1992 | ........... B29C 53/805 |
| GB | 2260961 A | | 5/1993 | |
| GB | 2424464 A | | 9/2006 | |
| GB | 2435317 | | 8/2007 | |
| JP | S61119874 A | | 6/1986 | |
| WO | 2008057405 A1 | | 5/2008 | |
| WO | 2009066070 A1 | | 5/2009 | |
| WO | 2009066070 A1 | | 5/2016 | |

* cited by examiner

CONNECTOR

FOREIGN PRIORITY

This application claims priority to Greek Patent Application No. 20150100371 filed Aug. 21, 2015, the entire contents of which is incorporated herein by reference.

TECHNICAL FIELD

The invention relates to a connector for mechanically joining a composite shaft to another component, a method of connecting a hollow composite shaft to a component, a connection assembly comprising the connector and a hollow composite shaft, a method of manufacturing a hollow composite shaft for connection to another component, a hydraulic actuator with a composite piston rod connected to a piston head, and a connection arrangement for connecting a hollow composite shaft to a component towards each end of the hollow composite shaft.

BACKGROUND

Composites are becoming more widely recognized as a viable solution to a range of applications due to their inherent strength to weight ratio. Composite tubular structures are currently used in many fields such as the motor sport, aerospace and medical fields. In use, composite tubular structures may be subjected to axial tensile and compressive loads, bending and torsional loadings. With increasing demand to transmit the working load directly through to the composite structure comes a requirement to design a suitable composite to end fitting or connector. The connector is required to connect the composite tubular structure to another component in such a way that the load path is optimised to the behaviour of the composite element. Particularly in high performance situations the connection device employed will ideally be designed such that it does not damage the composite matrix during assembly or usage.

A known connector for a composite tubular shaft is disclosed in WO 2009/066070. This connector comprises an embedded ovoid screw threaded nut over which the composite tubular shaft has been formed, and an annular collar for placement over the nut and composite material. The annular collar is axially moved relative to the embedded nut to exert a clamping load onto the composite material surrounding the nut.

There is a desire to, where possible, reduce the weight of the connector, simplify manufacture of the connector and design the connector so it can be used in many different applications.

SUMMARY

In a first aspect, the present invention provides a method of connecting a hollow composite shaft to a collar, the method comprising: providing a hollow composite shaft with a tapered portion towards one end; providing an insert, the insert comprising an outer tapered surface; inserting the insert into the tapered portion of the hollow composite shaft by passing the insert through the hollow composite shaft from the end of the hollow shaft which is distal to the tapered portion of the hollow composite shaft; providing a collar, the collar comprising an inner tapered surface; fitting the collar around (i.e. over) the insert and tapered portion of the hollow composite shaft; and axially forcing (i.e. urging) the collar and the insert in opposite directions so as to exert a clamping force onto the tapered portion of the hollow composite shaft between the outer tapered surface of the insert and the inner tapered surface of the collar.

In a second aspect, the present invention provides a connector for connecting a hollow composite shaft that has been manufactured to comprise an inwardly tapered portion (i.e. decreasing in diameter in a direction from an end of the hollow shaft which is distal to the tapered portion) towards one end of the hollow composite shaft, to a collar, wherein the connector comprises: an insert, the insert comprising an outer tapered surface; a collar, the collar comprising an inner tapered surface; and a tensioner, the tensioner being arranged, in use, to axially force the collar and the insert in opposite directions so as to exert a clamping force onto the tapered portion of the hollow composite shaft between the outer tapered surface of the insert and the inner tapered surface of the collar.

The insert may be sized to be received in the tapered portion of the hollow composite shaft such that the inner surface of the tapered portion of the hollow composite shaft in use will engage with the outer tapered surface of the insert, and the insert may be sized so as to be able to be inserted into the tapered portion from an end of the hollow shaft which is distal to the tapered portion.

The collar may be sized to fit over/around the insert and the tapered portion of the hollow composite shaft.

The present invention may provide a connector assembly comprising: a connector according to the second aspect; and a hollow composite shaft, wherein the hollow composite shaft has been manufactured to comprise an inwardly tapered portion towards one end of the hollow composite shaft.

Due to the fact that the insert can be inserted into the hollow composite shaft after the shaft has been fully manufactured (i.e. after it has been wound, infiltrated and cured), if there are any faults in the manufactured composite shaft the insert does not need to also be discarded. This can improve the efficiency and reduce the cost of manufacturing. The insert may be referred to as a non-embedded insert.

Since the hollow composite shaft is clamped between the insert and collar the connector and connector assembly is particularly suitable for transmitting axial compressive and tensile loads. Thus, the connector or connector assembly may be for the transfer of axial loads to and/or from the hollow composite shaft. This transfer of axial loads to and/or from the hollow composite shaft may be via the collar. The clamping force may act to fix the collar to the composite shaft.

The hollow composite shaft may be used as a piston rod in a hydraulic actuator. Alternatively the hollow composite tube may be used as a tie rod or in any other application where a rod undergoes tension and/or compression.

When the hollow composite shaft is a piston rod, the collar may be a piston head. The connector may therefore form part of a hydraulic actuator. The tapered portion of the hollow composite shaft (which may be a piston rod) may also be referred to as a connection portion.

Thus, in a third aspect the present invention may provide a hydraulic actuator; the hydraulic actuator comprising: a composite piston rod, the composite piston rod comprising a connection portion towards one end for permitting mechanical connection of the composite piston rod to a piston head, wherein the maximum outer diameter of the connection portion of the composite piston rod is equal to, or less than, the diameter of a main body portion of the piston rod to which a gland will seal during operation of the hydraulic actuator.

By having a composite piston rod where the connection portion has a maximum outer diameter which is equal to, or less than, the diameter of a main body portion of the piston rod, it is possible to use the composite rod as part of a hydraulic actuator which has a one-piece gland. This is because actuator rods are customarily assembled in hydraulic actuators by sliding the cylinder's gland along the rod and then securing the gland on the cylinder with a retraining ring. For this to be done, at least one end of the rod, e.g. the mechanical connection portion, needs to have an outer diameter that is, at most, equal to the outer diameter of the section of the rod that runs through the gland seal.

The connection portion may comprise an inwardly tapered portion. The mechanical connection may be achieved by clamping the tapered portion between the piston head and an insert (e.g. using the connector described above, wherein the piston head is the collar and the piston rod is the hollow composite shaft). The insert may be as described above.

The hydraulic actuator of the third aspect may have one or more of the features of the first and second aspects. The composite piston rod (i.e. hollow composite shaft) may be connected to the piston head (i.e. collar) by means of the above described connector and connection method.

Due to the way the hollow composite shaft is clamped between the insert and collar (i.e. a mechanical connection), there may be no need for adhesives or rivets to transfer the loads from the surfaces of the connector components to the surface of the composite shaft—it can rely on the mechanical action where the insert is pulled while the collar is pushed, thereby generating the clamping load on the composite. The clamping load may be of greater magnitude than the axial tensile or compressive loads that the system is under and therefore there may be no relative movement between the surfaces of the composite and the insert or collar during use which could cause fretting fatigue failure.

The insert may have maximum outer diameter which is the same as or less than the minimum inner diameter of the hollow composite shaft in the portion of the shaft before the tapered portion, i.e. the same as or less than the minimum inner diameter of the length of the hollow composite shaft the insert passes through before the tapered portion.

The shaft may have an internal diameter which is substantially constant along its length, apart from the tapered portion (and any second connection portion which may be present as explained below). The shaft may have a main body portion which extends from the tapered portion towards the end of the shaft which is distal to the tapered portion. The main body may have a constant inner diameter and/or a constant outer diameter.

The tapered portion may also be referred to as a connection portion of the hollow composite shaft. The hollow composite shaft may have a connection portion which comprises the tapered portion.

The maximum outer diameter of the tapered portion/connection portion of the hollow composite shaft rod may be equal to, or less than, the diameter of the main body portion. The largest diameter of the hollow composite shaft may be provided by the outer diameter of the main body portion which may have a substantially constant diameter along its length.

The tapered portion/connection portion may consist of a single inward taper.

The insert may also have (in addition to the tapered outer surface) a constant outer diameter portion, i.e. a length over which the outer diameter does not change. This constant outer diameter portion may have an outer diameter which is approximately the same as, or slightly smaller than the inner diameter of the main body portion of the hollow composite shaft.

When the insert is located in the hollow composite shaft the tapered outer surface may be in contact with the inner surface of the tapered portion of the hollow composite shaft and the constant outer diameter portion may be in contact with a portion of the inner surface of the main body of the hollow composite shaft.

The radial outer surface of the insert may consist of the tapered outer surface and the constant outer diameter portion. The tapered outer surface may taper inwardly (i.e. decrease in diameter) from the constant outer diameter portion. The constant outer diameter portion of the insert may be the part of the insert that has the greatest outer diameter.

The insert may have a hole (e.g. a bore) through the centre (in the length/axial direction, i.e. the direction of the taper). The insert may have an internally screw threaded surface which may be in the hole through the insert. The insert may be a tapered nut, such as internally threaded nut. The hole, in particular when it has an internally threaded surface, may allow the insert to be engaged with a component such as a tensioner so that it can be moved axially to provide the clamping force on the tapered portion. The hole also means that the weight of the insert can be reduced.

In addition to the inner tapered surface, the collar may also have a portion with a constant inner diameter. The constant inner diameter portion of the collar may engage with a portion of the outer surface of the main body of the hollow composite shaft (which may have a constant outer diameter).

The collar may be an annular ring. The collar may have an aperture through the middle of the collar which in use receives the tapered portion of the composite shaft. The minimum diameter of the aperture of the collar may be equal to, or greater (preferably only slightly greater) than, the minimum outer diameter of the tapered portion and/or the minimum diameter of the aperture of the collar may be less than the maximum outer diameter of the tapered portion. This allows the collar to fit over the tapered portion and be located radially outwardly around the tapered portion whilst not allowing the tapered portion to slide over the entire length of the tapered portion.

The collar and the insert may be axially forced in opposite directions so as to exert a clamping force onto the tapered portion of the hollow composite shaft between the outer tapered surface of the insert and the inner tapered surface of the collar. The force may be provided and/or maintained by means of a tensioner.

The insert may be axially moved into or urged against the tapered portion of the hollow composite shaft and the collar may be axially forced onto or urged against the tapered portion of the hollow composite shaft. The insert may be moved axially (e.g. by pulling/being under tension) in a direction away from the distal end of the hollow composite shaft and the collar may be moved axially (e.g. by pushing/being under compression) in a direction towards the distal end of the hollow composite shaft.

The tensioner may be any means that can act to pull the insert into the tapered portion and push the collar onto the tapered portion so as to clamp the tapered portion therebetween. The tensioner may provide a preload on the connection by pulling on the insert whilst pushing on the collar.

When the insert has an internally threaded surface, the tensioner may comprise a threaded bolt which can engage with the internally threaded surface of the insert. The tensioner may comprise one or more load means, such as secondary bolts (or screws), which can exert a force against the collar. The secondary bolts may be referred to as compression grab bolts.

For example, the threaded bolt of the tensioner that can engage with the internally threaded surface of the insert (which may be referred to an the main bolt of the tensioner), may have a bolt head which extends radially so as to extend over at least a portion of the axial end face of the collar (which is located radially outwardly of the insert and hollow composite shaft). The load means may engage with and extend through the bolt head to axially load the collar. The clamp force may be generated by rotation of the load means to increase the axial spacing of the bolt head from the collar, i.e. the bolt pulls the insert while pushing the collar via the load means, thereby generating a clamping force on the composite between the collar and the insert. The bolt head may comprise a plurality of holes which are spaced around the circumference of the bolt head. These holes may be for the load means and the holes may be threaded holes for when the load means are secondary bolts/screws. By having a plurality of load means spaced circumferentially around the axial end face of the collar means that the force applied between the collar and the main bolt can be applied evenly and gradually over the circumference.

To preload the connector, the main bolt may be engaged with the insert. This may be achieved by screwing the main bolt into the insert. The insert and collar may then be forced axially in opposite directions by screwing the load means into the holes in the bolt head of the main bolt to provide a force between the collar and the bolt (which is connected to the insert).

The tensioner may be designed so that is only exerts a force on the collar and the insert. The tensioner may be designed so that it does not put any direct force on, e.g. by not directly contacting, the hollow composite shaft. In other words the connector may be designed so that no force is put on the axial end face of the hollow composite shaft. There may be a gap between the axial end surface of the hollow composite shaft and the connector, such as the tensioner or collar. This may be achieved for example by designing the collar so that when it is urged onto the tapered portion of the hollow composite shaft there is a portion of the collar which protrudes axially beyond the end axial face of the hollow composite shaft to ensure that there is a gap at the axial end face of the hollow composite shaft. Additionally, or alternatively, the tensioner may have an annular recess on its inner face (e.g. the bolt head) which faces the end of the hollow composite shaft. This annular recess may ensure that there is a gap at the axial end face of the hollow composite shaft.

The connector may be designed so that all, or substantially all, the force on the hollow composite shaft is on the inner and outer tapered surfaces (which are substantially radially facing) rather than the axial end face. This is because the axial end face is not generally designed to be a load bearing surface.

The tapered portion of the hollow composite shaft may have taper angles on the inner and outer diameters of the tapered portion.

The outer diameter taper angle may be the angle between the outer diameter surface of the main body of the hollow composite shaft and the outer surface of the tapered portion. In other words, if the outer surface of the main body was imagined to continue over the tapered portion, the outer diameter taper angle would be the angle between the imaginary extension of the outer surface of the main body and the actual outer surface of the tapered portion.

The inner diameter taper angle may be the angle between the inner diameter surface of the main body of the hollow composite shaft and the inner surface of the tapered portion. In other words, if the inner diameter surface of the main body of the hollow composite shaft was imagined to continue over the tapered portion, the inner diameter taper angle would be the angle between the imaginary extension of the inner surface of the main body and the actual inner surface of the tapered portion.

The inner taper angle and/or the outer taper angle of the tapered portion of the composite shaft may be between 5 and 15 degrees or 8 and 15 degrees. For example, the taper angle may be about 10 degrees.

A higher taper angle is beneficial as more load can be transferred per unit length. However, the higher the taper angle the more difficult it is to manufacture the hollow composite shaft. Therefore the taper angle is a trade-off between these two factors. It has been found that a range of 8 to 15 degrees provides a good load transfer whilst being relatively straightforward to manufacture.

It has been found that an arrangement with a hollow composite shaft of 1 inch (about 2.5 cm) diameter and an inner and outer diameter taper angle of about 10 degrees it is possible to transmit over 130 kN of load.

The inner taper angle and the outer taper angle of the tapered portion of the composite shaft may be different.

It has been found that in certain applications the tensile and compressive loads transferred through the hollow composite shaft are different. For example, it has been found in certain hydraulic actuators the compressive load can be significantly lower than the tensile load due to the way the cylinder chambers are pressurised. For example, the ratio of tensile load to compressive load may be between 1.5:1 and 5:1, between 2:1 and 4:1 or about 3:1.

During use, inside the connector assembly, axial loads result in hoop and through thickness stresses. By having a composite shaft with different taper angles on the inner diameter and the outer diameter of the tapered portion the ratio of hoop:through thickness stresses can be tailored to give a joint of maximum strength.

When the tensile load on the hollow composite shaft is greater than the compressive load, the connector assembly may be designed so that the outer diameter taper angle is less than the inner diameter taper angle. In this case, at the preloading stage (when the insert and collar have been axially forced in opposite directions to clamp the taper portion) the different angles will result in a greater normal load being transferred through the outer diameter than through the inner diameter of the hollow composite shaft. The can result in the composite shaft being pre-loaded in hoop compression. As a result, when a tensile load is applied in service, the resulting hoop tension will be lower with a larger portion of the load being transferred as through thickness compression.

For example, the ratio of inner diameter taper angle to outer diameter taper angle may be 1.25:1 to 2:1, or about 1.5:1.

Conversely, when the tensile load on the hollow composite shaft is expected to be less than the compressive load in use, the connector assembly may be designed so that the outer diameter taper angle is greater than the inner diameter taper angle. In this case, at the preloading stage (when the insert and collar have been axially forced in opposite directions to clamp the taper portion) the different angles will result in a greater normal load being transferred being transferred through the inner diameter than through the outer diameter of the hollow composite shaft. This can result in the composite shaft being pre-loaded in through thickness compression.

When the inner diameter taper angle is greater than the outer diameter taper angle, the hollow composite shaft may increase in thickness along the tapered portion away from the distal end of the shaft.

When the inner diameter taper angle is less than the outer diameter taper angle, the hollow composite shaft may decrease in thickness along the tapered portion of the hollow composite shaft away from the distal end of the shaft.

The hollow composite shaft may be manufactured to have the different inner and outer diameter taper angles.

The method of making the connector assembly may comprise determining the tensile and compressive forces that are expected to be encountered during use of the connector and designing the hollow composite shaft to have a ratio of inner and outer taper angles based on the expected forces to be encountered during use.

The method may include designing and/or manufacturing the hollow composite shaft to have an inner diameter taper angle which is greater than the outer diameter taper angle when the tensile load is expected to be greater than the compressive load during operation.

The method may include designing and/or manufacturing the hollow composite shaft to have an inner diameter taper angle which is less than the outer diameter taper angle when the tensile load is expected to be less than the compressive load during operation.

The angle of the outer tapered surface of the insert may correspond to the angle of the inner tapered surface of the hollow composite shaft. The angle of the inner tapered surface of the collar may correspond to the angle of the outer tapered surface of the tapered portion of the hollow composite shaft. Thus, the angle of the outer tapered surface of the insert may be different to the angle of the inner tapered surface of the collar.

The hollow composite shaft may have at the distal end (to the tapered portion) a second connector. Thus, the above described connector (i.e. the connector of the second aspect) which comprises an inwardly tapered portion of the hollow shaft and a tapered insert may be referred to as a first connector. The second connector at the distal end may be of the form described in WO 2009/066070.

The second connector may comprise an embedded nut. The hollow composite shaft may be manufactured on the embedded nut. For example the fiber may be laid up on the embedded nut, infiltrated with a curable material and then cured. The embedded nut may be shaped to receive in use composite material applied around the nut in a green state during shaft manufacture.

The embedded nut may be designed so that the insert of the first connector can be inserted through the embedded nut. The embedded nut may have a hole through the centre of it through which the insert of the first connector can pass.

Thus in a fourth aspect the present invention provides a connection arrangement for connecting a hollow composite shaft to a collar towards each end of the hollow composite shaft, the connection arrangement comprising: the hollow composite shaft, a first connector which comprises an insert; and a second connector which comprises an embedded nut, wherein the hollow composite shaft comprises a first connection portion towards a first end of the hollow composite shaft for the first connector, the first connection portion comprising a tapered portion, wherein the hollow composite shaft comprises a second connection portion towards a second end of the hollow composite shaft for the second connector, wherein the hollow composite shaft at the second connection portion has been formed around the embedded nut, wherein the insert is sized to be received in the tapered portion of the hollow composite shaft, and wherein the minimum inner diameter of the embedded nut is such that the insert can be inserted into the tapered portion through the embedded nut.

The first connector may be the connector of the second aspect (optionally including one or more of the above described optional features). The hollow composite shaft may have one or more of the features of the above described hollow shaft.

The tapered portion may be an inwardly tapered portion (i.e. decreasing in diameter in a direction away from the embedded nut)

Due to the fact that the insert can be inserted through the embedded nut, it is possible to provide a connector at each end of the hollow composite shaft while also allowing the above described advantages of the above described first connector (such as reduced weight and a smaller maximum outer diameter) to be achieved.

The embedded nut may have an external surface which is substantially ovoid. The composite formed around the embedded nut may thus be flared outwards and inwards over the nut.

The second connector may be provided with a collar and tensioner as described above in connection with the first connector. Thus the second connector may comprise a collar; the collar comprising an inner tapered surface and being sized to fit over at least a portion of the embedded nut and a portion of the hollow composite shaft which surrounds the embedded nut. The second connector may also comprise a tensioner, the tensioner being arranged to in use to axially force the collar and the embedded nut in opposite directions (e.g. the embedded nut in a direction away from the first connector and the collar in a direction towards the first connector) so as to exert a clamping force onto the portion of the hollow composite shaft between an outer surface of the insert and the inner tapered surface of the collar.

The tensioner of the second connector may comprise a bolt (which may be referred to as a second bolt) that can engage with the embedded nut and load means, such as compression bolts/screws, which can be moved axially (e.g. by screwing them into a radially extending bolt head on the second bolt) to allow the clamping force on the hollow composite shaft.

The tensioner may be shaped so that it does not exert any force directly onto the axial end face of the composite shaft. For example, the radially extending bolt head may have an annular recesses so that when the load means is/are tightened to exert a force on the collar the annular recess results in there being a gap at the end of the composite shaft.

The second connector may have one or more of the features, including the optional features, described above in connection with the first connector.

The hollow composite shaft may have fibre alignment which is uni-directional or multiaxial and may be manufactured by composite stitching, lay-up, filament winding or any other process known for producing tubular composite elements. The composite structure may also be produced from any known fibre and matrix combination. For example, the hollow composite shaft may have carbon or glass for the fibre, and may have thermoset or thermoplastic polymers for the matrix. The material of the connector may be determined by the nature and magnitude of the desired load case and environmental conditions.

The manufacturing technique may be determined by the selected materials, size and required dimensional accuracy.

The connector components, such as the insert, embedded nut and collar, tensioner(s) etc may be made of metal. For example, one or more of these components may be made of stainless steel.

The present invention may also provide a method of manufacturing the above described connector assembly or arrangement.

The step of providing the hollow composite shaft may comprise manufacturing the hollow composite shaft. As mentioned above, the hollow composite shaft may be made by winding. This may involve winding a filament or filaments of the composite into the desired shape, infiltrating the wound filament(s) with a curable material, e.g. resin, and curing the infiltrated curable material to form the composite shaft.

Thus in a fifth aspect, the present invention provides a method of manufacturing a hollow composite shaft for a connector assembly for connecting a hollow composite shaft to a collar, the method comprising: providing a winding mandrel, the mandrel comprising a tapered portion; winding a filament (or filaments) onto the winding mandrel; infiltrating the wound filament(s) with a matrix material to form an infiltrated wound tube; curing the infiltrated wound tube to form a composite tube with a tapered section; and removing the composite tube from the winding mandrel.

A special winding mandrel may be provided for winding the fiber onto. The shape of the winding mandrel may provide the inner diameter shape of the hollow composite shaft.

Towards a first end (the end of the first connector) the mandrel may have a tapered shape. The mandrel may be shaped to allow it to be extracted from the hollow composite shaft once formed by removing it through the end which is distal to the tapered portion.

When the hollow composite shaft comprises an embedded nut, the embedded nut may be attached to the winding mandrel before the process of winding the fiber(s). In this case, the mandrel may have one or more grooves for a seal such as an o-ring. This is so that one or more o-ring seals may be attached to prevent resin leaking to the thread at the internal diameter of the embedded nut. For example, a groove and corresponding seal may be provided at either side of the threaded portion of the embedded nut.

The mandrel may have a step where the embedded nut is located.

The embedded nut may be locked to the mandrel by means of a pin. This pin is provided to prevent the nut from spinning and/or moving axially. The pin may be a pin which can be broken (e.g. sheared) during extraction of the mandrel from the formed composite shaft so that the embedded nut remains inside the composite shaft rather than being extracted with the mandrel. The pin may for example be a nylon pin.

The mandrel may be connected to a winding machine. This allows the mandrel to be spun during the winding process. The end near the tapered portion may be connected to a chuck and the end distal from the tapered portion may be connected to the centre of the winding machine.

Once the filament winding process and the curing process are completed, the mandrel may be extracted from the composite shaft. The pin may be sheared during extraction and the embedded nut may stay inside the composite.

The composite rod may be cut at either or both ends to achieve the required length.

The outside diameter profile maybe machined to achieve the required diameter tolerances.

When assembling the connector assembly (after the composite shaft has been formed and the winding mandrel (if used) has been removed), the tapered insert may be dropped down into the hollow composite shaft until it stops at the tapered end. If the arrangement comprises an embedded nut, the insert will be inserted through the hole in the embedded nut into the hollow composite shaft. The collar (which may for example be a piston head) may be put over the tapered portion and insert. The bolt of the tensioner may be screwed into the insert and then the load means screwed into the head of the bolt and tightened up to clamp the tapered portion between the insert and the collar. The load means are screwed through each threaded hole of the bolt head until the desired preload is transferred to the collar and the insert.

If the assembly comprises the second connector, once the first connector has been assembled, the collar of the second connector may be located over a portion of the embedded nut and hollow composite shaft. The bolt of the tensioner may be screwed into the embedded nut to the desired length. Load means, e.g. compression bolts/screws, may then be screwed into the bolt head to exert a force on the collar. The load means may be tightened onto the collar until the required preload is applied to the collar.

BRIEF DESCRIPTION OF THE DRAWINGS

Certain preferred embodiments of the present invention will now be described by way of example only with reference to the accompanying drawings, in which.

DETAILED DESCRIPTION

Figure 1:
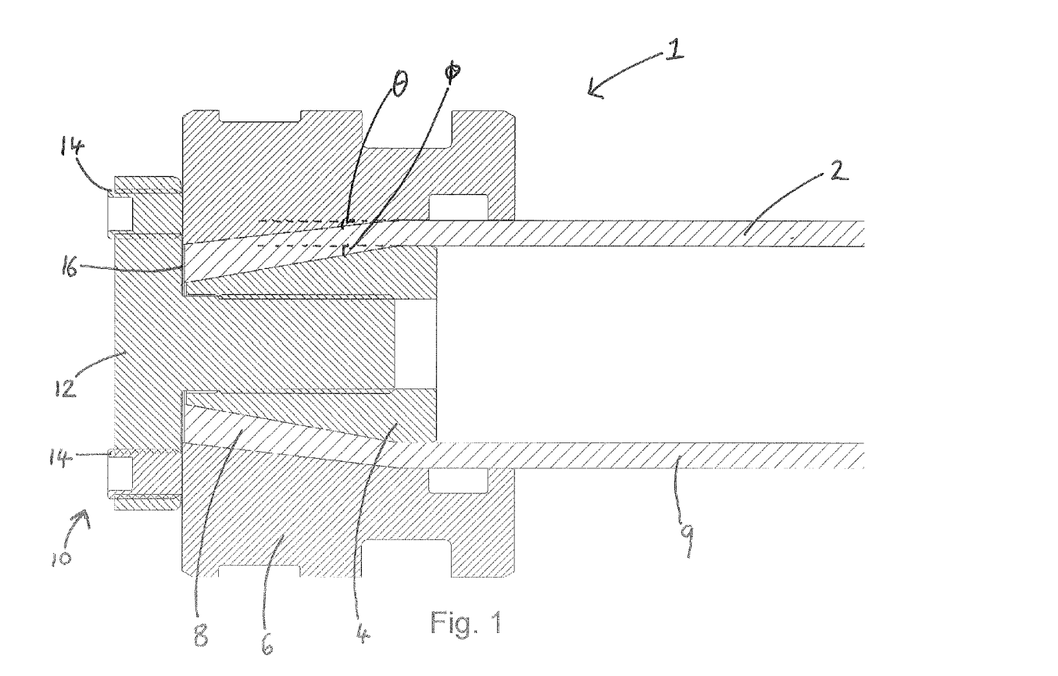
FIG. 1 shows a cross section of a connector assembly connecting a hollow composite shaft to a collar using a first connector.

FIG. 1 shows a connector assembly 1 which comprises a hollow composite shaft 2, an insert 4 and a collar 6. The insert 4 and collar 6 may be made of metallic materials such as stainless steel.

The hollow composite shaft 2 comprises an inwardly tapered portion 8 at one end and a main body portion 9. The main body portion 9 has a substantially constant inner and outer diameter. The outer diameter (at any given point) of the tapered portion 8 is the same as, or less than the outer diameter of the main body portion 9. This means that components (such as a gland seal of a hydraulic actuator which are not shown in figures) can be slid onto the composite shaft 2 over the tapered end portion 8 before the collar 6 is attached to the end of the hollow composite shaft 2.

The insert 4 has an external tapered surface which engages with the internal tapered surface of the tapered portion 8. The collar 6 has an inner tapered surface which engages with the external tapered surface of the tapered portion 8.

In this embodiment the collar 6 is a piston head and the hollow composite shaft 2 is a piston rod.

The connector assembly 1 comprises a tensioner 10. The tensioner 10 may also be made of a metallic material such as stainless steel. The tensioner 10 comprises a main bolt 12 and a plurality of load means in the form of screws 14. The main bolt 12 has a bolt head in which there are a plurality of threaded holes for receiving the screws 14 (two of these are shown in the cross section of FIG. 1). The holes for the plurality of screws 14 may be spaced about the circumference of the bolt head. This is so the load applied on the collar 6 by the tensioner 10 can be applied gradually and evenly over the circumference of the collar 6.

When assembled there is a gap 16 (which can just be seen for example in FIG. 1) between the end of the hollow composite shaft 2 and the tensioner 10. This is so that no force is exerted on the axial end face of the hollow composite shaft 2.

The tapered portion 8 of the composite shaft 2 has an inner diameter taper angle $\phi$ and an outer diameter taper angle $\theta$. Each of these taper angles $\phi$, $\theta$ is between 8 to 15 degrees and the taper angles $\phi$, $\theta$ may be different.

For example, when the ratio of tensile load to compressive load is 3:1, the ratio of ID taper angle $\phi$ to OD taper angle $\theta$ may be 1.5:1.

As shown in FIG. 1, the outer diameter taper angle $\theta$ is the angle between the outer diameter surface of the main body of the hollow composite shaft and the outer surface of the tapered portion. In other words, if the outer surface of the main body was imagined to continue over the tapered portion (as shown by the upper dotted line), the outer diameter taper angle would be the angle between the imaginary extension of the outer surface of the main body and the actual outer surface of the tapered portion.

The inner diameter taper angle $\phi$ is the angle between the inner diameter surface of the main body of the hollow composite shaft and the inner surface of the tapered portion. In other words, if the inner diameter surface of the main body of the hollow composite shaft was imagined to continue in a straight line over the tapered portion (as shown by the lower dotted line), the inner diameter taper angle would be the angle between the imaginary extension of the inner surface of the main body and the actual inner surface of the tapered portion.

To form the connector assembly 1 the insert 4 is inserted through the hollow composite shaft 2 from an end which is distal to the tapered portion 8 of the hollow composite shaft. The collar 6 is pushed over the insert 4 and the tapered portion 8 so that the collar 6 is radially outwardly of at least a portion of the insert and the tapered portion 8. The bolt 12 of the tensioner 10 is screwed into the insert 4 and the screws 14 are then tightened to axially force the collar 6 onto the tapered portion 8 (i.e. towards the distal end of the hollow composite shaft 2) and axially force the insert 4 into the tapered portion (i.e. away from the distal end of the follow composite shaft 2). This acts to clamp the tapered portion 8 of the hollow composite shaft 2 between the insert 4 and collar 6 so as to fix the collar on the hollow composite shaft.

Figure 2:
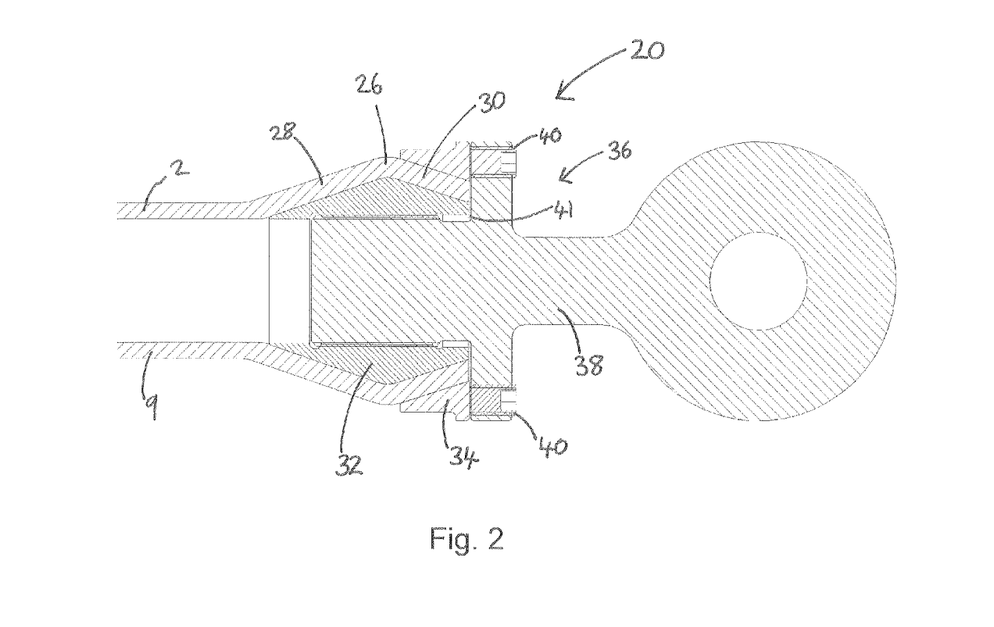
FIG. 2 shows a cross section of another connector assembly connecting a hollow composite shaft to a collar using a second connector.

FIG. 2 shows another connector assembly 20. This connector also comprises a hollow composite shaft 2. The hollow composite shaft comprises a main body portion 9 of substantially constant diameter and a flared portion 26. The flared portion 26 comprises an outwardly tapered portion 28 (in a direction toward the end of the hollow composite shaft 2) and an inwardly tapered portion 30 (again in a direction towards the end of the hollow composite shaft 2).

The connector assembly 20 comprises an embedded nut 32. The hollow composite shaft 2 is formed onto the embedded nut 32 during manufacture (e.g. when the composite is in the green state) to form the flared portion 26.

The embedded nut 32 has a substantially ovoid shape.

The connector assembly 20 comprises an annular wedge 34. The annular wedge 34 has an inner tapered surface which corresponds to the outer tapered surface of the inwardly tapered portion 30 of the flared portion 26 of the hollow composite shaft 2.

The connector assembly 20 comprises a tensioner 36 which comprises a main bolt 38 and screws 40.

The main bolt 38 has an annular recess so that when the tensioner 36 exerts force on the annular wedge 34 there will be a gap 41 between a bolt head of the main bolt 38 and the axial end face of the hollow composite shaft 2. This means that it is possible to avoid putting any direct force on the axial end face of the hollow composite shaft 2.

To form the connector assembly 20 the annular wedge 34 is pushed over a portion of the embedded nut and inwardly tapered portion 30 of the hollow composite shaft 2. The main bolt 38 is then screwed into the embedded nut 32 to a desired length. The screws 40 may then be screwed through the bolt head of the main bolt 38 to force the annular wedge 34 onto the inwardly tapered portion 30 and to force the embedded nut 32 in the opposite direction. This causes the inwardly tapered portion 30 of the hollow composite shaft 2 to be clamped between the embedded nut 32 and the annular wedge 34.

Figure 3:
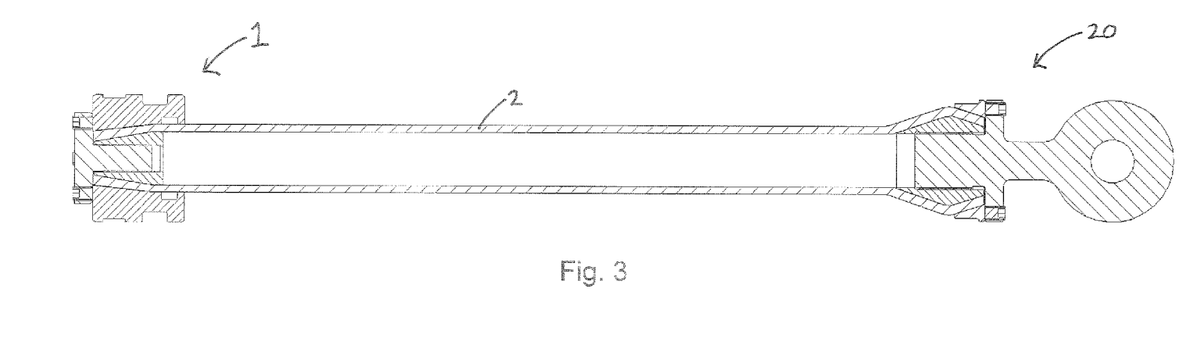
FIG. 3 shows a cross section of a hollow composite shaft comprising the connector shown in FIG. 1 on one end and the connector shown in FIG. 2 on the other end.

FIG. 3 shows a hollow composite shaft 2 with the connector assembly 1 (as shown in detail in FIG. 1) at a first end and the connector assembly 20 (as shown in detail in FIG. 2) at the other end.

The inner diameter of the embedded nut 32 is large enough that the insert 4 can pass through the centre of the embedded nut 32. This means that connector assembly 1 can be formed even when the nut 32 is embedded in the composite tube 2 during manufacture.

Figure 4:
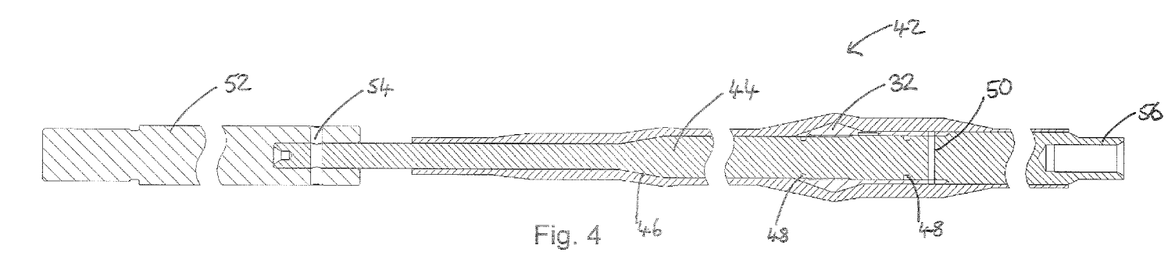
FIG. 4 shows a cross section of a winding assembly for manufacturing a hollow composite tube.

FIG. 4 shows a cross section of a winding assembly 42 for manufacturing the hollow composite tube 2.

The winding assembly 42 comprises a winding mandrel 44. The winding mandrel has a tapered portion 46 for forming the tapered portion 8 of the hollow composite tube 2. The mandrel 44 is shaped so that it can be extracted from the hollow composite tube 2 after curing.

Before winding, the embedded nut 32 is attached to the winding mandrel 44 at the end where the second connector assembly 20 will be formed (opposite the tapered end 8). The mandrel 44 at this side has two annular grooves 48 which each extend circumferentially around the winding mandrel 44 so that o-ring seals can be attached to prevent resin leaking to the thread at the internal diameter of the embedded nut 32. The mandrel 44 has a step where the embedded nut 32 is located. A nylon pin 50 is provided that connects the embedded nut 32 with the mandrel 44. This is to lock the nut 32 from spinning and moving axially. There is an extension 52 at the left side (the side near the tapered end) which is connected with the mandrel using a pin 54.

The whole system may then be attached in the winding machine. Specifically, the extension 52 is attached to a chuck and the other side is attached to a centre of the winding machine via a winding machine attachment portion 56. When the filament winding process and the curing profile are completed, the mandrel 44 is extracted from the composite tube 2. The nylon pin 50 is sheared during extraction and the embedded nut 32 stays inside the composite 2. Afterwards, the composite rod 2 is cut at both sides to achieve the required length and the outside diameter profile is machined to achieve the required diameter tolerances.

The invention claimed is:

1. A shaft assembly comprising:
a hollow composite shaft;
wherein the hollow composite shaft has been manufactured to comprise an inwardly tapered linear portion towards one end of the hollow composite shaft;
wherein an inner taper angle and an outer taper angle of the tapered portion of the composite shaft are different to each other, wherein the inner taper angle and the outer taper angle both comprise non-zero values;
a connector for connecting the hollow composite shaft to a collar, wherein the connector comprises:
an insert, the insert comprising an outer tapered surface, the insert being sized to be received in the tapered portion of the hollow composite shaft such that the inner surface of the tapered portion of the hollow composite shaft in use will engage with the outer tapered surface of the insert, and the insert being sized so as to be able to be inserted into the tapered portion from an end of the hollow shaft which is distal to the tapered portion;
a collar, the collar comprising an inner tapered surface and being sized to fit over the insert and the tapered portion of the hollow composite shaft; and
a tensioner, the tensioner being arranged, in use, to axially force the collar and the insert in opposite directions so as to exert a clamping force onto the tapered portion of the hollow composite shaft between the outer tapered surface of the insert and the inner tapered surface of the collar;
wherein the hollow composite shaft comprises the inwardly tapered portion before attaching the connector to the hollow composite shaft.

2. A shaft assembly according to claim 1, wherein the hollow composite shaft has a main body portion which extends from the tapered portion towards the end of the shaft which is distal to the tapered portion, and wherein the insert has a maximum outer diameter which is the same as or less than the minimum inner diameter of the main body portion of the hollow composite shaft.

3. A shaft assembly according to claim 1, wherein an inner taper angle and/or an outer taper angle of the tapered portion of the hollow composite shaft is between 8 and 15 degrees.

4. A shaft assembly according to claim 1, wherein the outer taper angle is less than the inner taper angle.

5. A shaft assembly according to claim 1, wherein the hollow composite shaft is a piston rod of a hydraulic actuator, and wherein the collar is a piston head of a hydraulic actuator.

6. A shaft assembly according to claim 1, wherein a second connector is provided towards the end of the hollow composite shaft which is distal to the tapered portion, wherein the second connector comprises an embedded nut, and wherein the insert can be inserted through the embedded nut.

* * * * *